US012691757B2

(12) United States Patent
Miyazawa

(10) Patent No.: US 12,691,757 B2
(45) Date of Patent: Jul. 28, 2026

(54) VEHICLE DISPLAY DEVICE

(71) Applicant: YAZAKI CORPORATION, Tokyo (JP)

(72) Inventor: Tomohiro Miyazawa, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/807,881

(22) Filed: Aug. 16, 2024

(65) Prior Publication Data

US 2025/0074192 A1      Mar. 6, 2025

(30) Foreign Application Priority Data

Aug. 30, 2023     (JP) ................................. 2023-140086

(51) Int. Cl.
B60K 35/233          (2024.01)
B60K 35/235          (2024.01)

(52) U.S. Cl.
CPC .......... B60K 35/233 (2024.01); B60K 35/235 (2024.01); *B60K 2360/21* (2024.01); *B60K 2360/23* (2024.01); *B60K 2360/31* (2024.01)

(58) Field of Classification Search
None
See application file for complete search history.

(56) References Cited

U.S. PATENT DOCUMENTS

| | | | | |
|---|---|---|---|---|
| 2019/0137770 A1* | 5/2019 | Huang | .................... | G06F 3/011 |
| 2020/0320960 A1* | 10/2020 | Yamase | .................. | G02B 27/01 |
| 2021/0174767 A1* | 6/2021 | Edgren | ................. | G09G 3/002 |
| 2021/0302727 A1* | 9/2021 | Sugiyama | ............. | B60K 35/28 |
| 2022/0270527 A1* | 8/2022 | Tachiiri | ............... | B60K 35/235 |
| 2022/0277673 A1* | 9/2022 | Iwasaki | .................. | B60K 35/10 |

FOREIGN PATENT DOCUMENTS

JP          2016-130771 A      7/2016

\* cited by examiner

*Primary Examiner* — Christopher R Lamb
(74) *Attorney, Agent, or Firm* — KENEALY VAIDYA LLP

(57) ABSTRACT

A vehicle display device including an image display unit and a control unit is provided. An image includes a both-eye region that is a region visually recognized by both eyes of the driver and a one-eye region that is a region visually recognized by only one eye of the driver. The control unit sets a non-display region at a boundary portion between the both-eye region and the one-eye region and perform control such that at least no static image is displayed in the non-display region.

3 Claims, 5 Drawing Sheets

CR(CRL)    CB    CL(CRL)

CN    CN

W

VEHICLE DISPLAY DEVICE

CROSS-REFERENCE TO RELATED APPLICATIONS

This application is based on and claims priority under 35 USC 119 from Japanese Patent Application No. 2023-140086 filed on Aug. 30, 2023, the contents of which are incorporated herein by reference.

TECHNICAL FIELD

The present disclosure relates to a vehicle display device.

BACKGROUND ART

In the related art, there is known a vehicle display device such as a head-up display for visually recognizing an image as a virtual image from positions of eyes (eyepoint) of a driver. For example, Patent Literature 1 describes a display device having improved visibility of an image by making luminance of a one-eye region of the image that is visually recognizable only by one eye higher than luminance of a both-eye region of the image that is visually recognizable by both eyes.

CITATION LIST

Patent Literature

Patent Literature 1: JP2016-130771A

SUMMARY OF INVENTION

However, in the related art described above, an image displayed in a vicinity of a boundary between the one-eye region and the both-eye region may cross over the boundary due to movement of a head of the driver or the like. When the image crosses the boundary in this manner, the driver may have an uncomfortable feeling.

The present disclosure is made in view of the above circumstance, and an object of the present disclosure is to provide a vehicle display device that can reduce an uncomfortable feeling of a driver.

To achieve the above object, the vehicle display device according to the present disclosure has following features.

The vehicle display device includes an image display unit that emits display light for an image; an optical system that projects the display light emitted from the image display unit toward a reflecting surface in front of a driver; and a control unit that controls the image display unit. The image includes a both-eye region that is a region visually recognized by both eyes of the driver and a one-eye region that is a region visually recognized by only one eye of the driver, and the control unit sets a non-display region at a boundary portion between the both-eye region and the one-eye region and controls such that at least no static image is displayed in the non-display region.

According to the present disclosure, it is possible to provide a vehicle display device that can reduce an uncomfortable feeling of a driver.

The present disclosure is briefly described above. Details of the present disclosure can be further clarified by reading a mode (hereinafter, referred to as "embodiment") for carrying out the invention to be described below with reference to the accompanying drawings.

DESCRIPTION OF EMBODIMENTS

A specific embodiment of the present disclosure will be described below with reference to the drawings.

Figure 1:
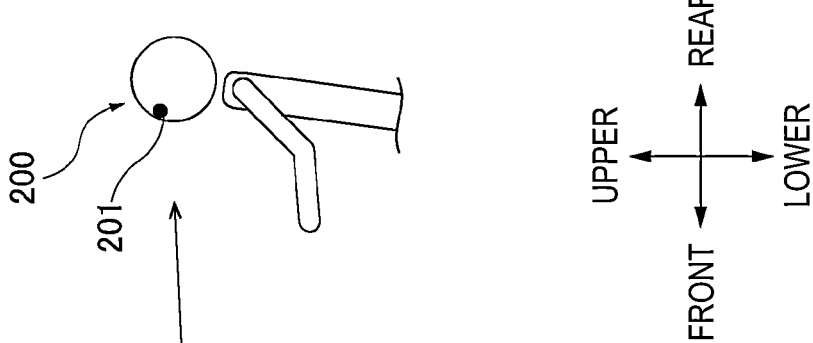
FIG. 1 is a schematic configuration diagram showing a vehicle display device according to an embodiment.
Figure 1:
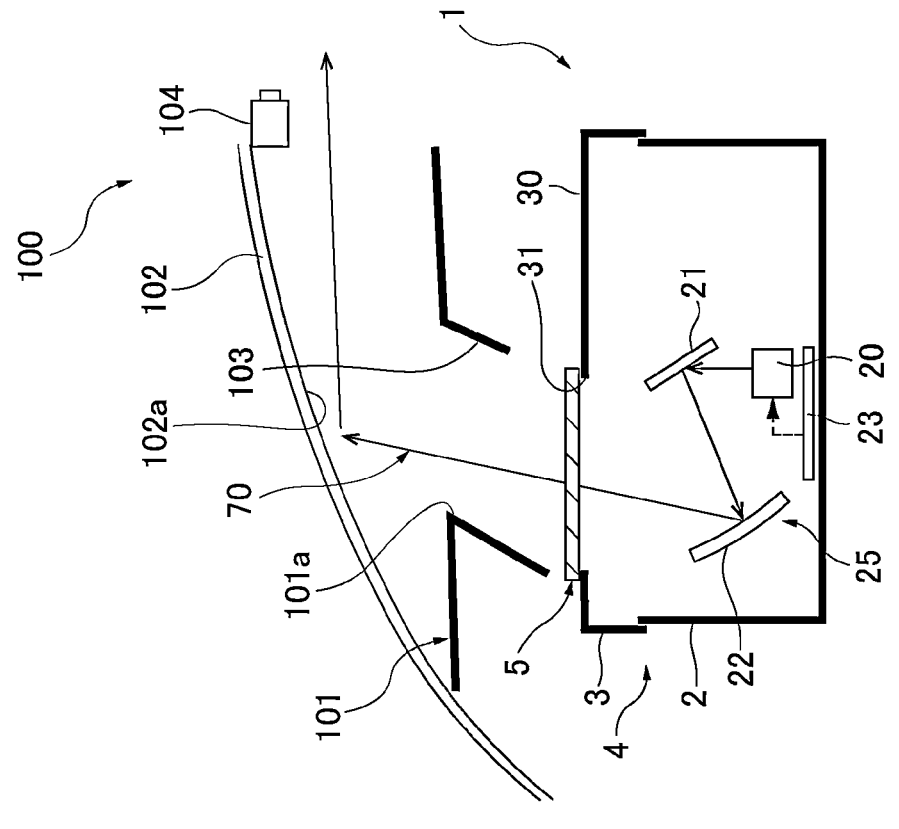
Figure 2:
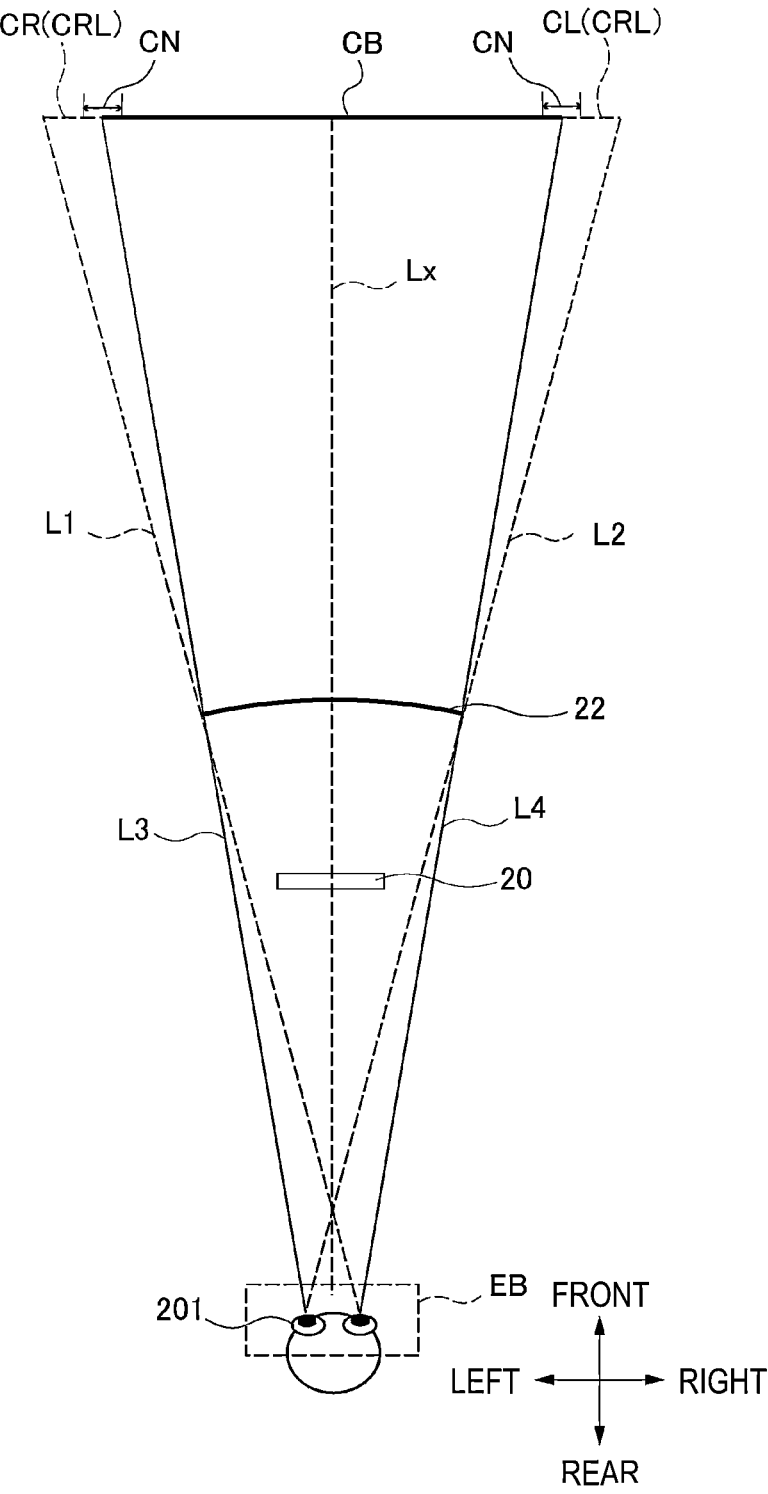
FIG. 2 shows an optical positional relationship among a virtual image, a second mirror, and eyes of a driver when the eyes of the driver are located in a center of an eye box in a left-right direction.
Figure 3:
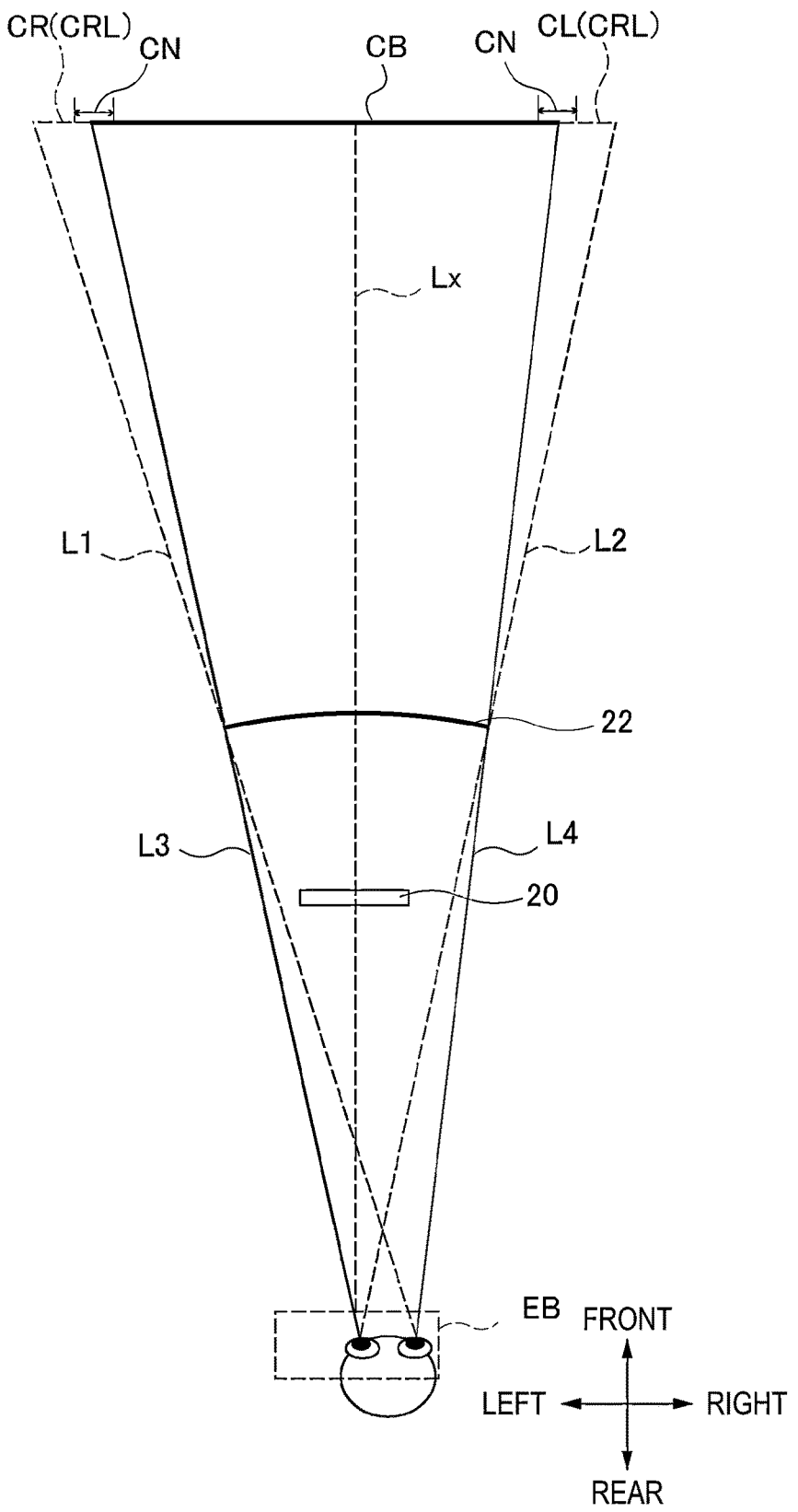
FIG. 3 shows an optical positional relationship among the virtual image, the second mirror, and the eyes of the driver when the eyes of the driver are on a right side of the eye box.

Hereinafter, for convenience of description, "front", "rear", "left", "right", "upper", and "lower" are defined as shown in FIGS. 1 to 3. A "front-rear direction", a "left-right direction", and an "upper-lower direction" are orthogonal to one another. The left-right direction corresponds to a "horizontal direction" of the present disclosure.

As shown in FIG. 1, a vehicle display device 1 of the present embodiment is mounted on a vehicle 100 and constitutes a head-up display. The vehicle display device 1 is disposed, for example, inside an instrument panel 101. The instrument panel 101 has an opening 101a that opens upward. The opening 101a faces a windshield 102 in the upper-lower direction of the vehicle 100.

The vehicle display device 1 includes a case 4, a cover 5, an image display unit 20, a control unit 23, and an optical system 25. The image display unit 20, the control unit 23, and the optical system 25 are accommodated inside the case 4. The case 4 includes a body 2 and a lid member 3 that engages with the body 2. The body 2 has an opening that opens upward. The lid member 3 closes the opening of the body 2 from above. The lid member 3 includes a wall portion 30 that faces the opening 101a. The wall portion 30 has an opening 31 that opens upward. The case 4 is disposed such that the opening 31 faces the opening 101a. The cover 5 is a plate-shaped member that closes the opening 31 of the lid member 3. The cover 5 is formed of a light-transmissive resin such as polycarbonate (PC) and acrylic.

The image display unit 20 is a device that emits display light 70 for an image. The shown image display unit 20 is a liquid crystal display device, and is, for example, a thin film transistor liquid crystal display (TFT-LCD). However, the image display unit 20 is not limited to the liquid crystal display device. The image display unit 20 may be, for example, a device that generates an image on a transmissive screen by scanning the screen with laser light.

The optical system 25 includes a first mirror 21 and a second mirror 22. The first mirror 21 reflects the display light 70 emitted from the image display unit 20 toward the second mirror 22. The first mirror 21 is, for example, a plane mirror. The second mirror 22 reflects the display light 70 toward the windshield 102. A shape of a reflecting surface of the second mirror 22 is, for example, a free-form surface. The second mirror 22 is, for example, a concave mirror that enlarges the display light 70.

The display light 70 reflected by the second mirror 22 passes through the opening 31 and the opening 101a, and is reflected toward a driver 200 by a reflecting surface 102a of the windshield 102. A virtual image is formed by the display light 70 incident on eyes 201 of the driver 200. The instrument panel 101 is provided with a tubular wall portion 103. The wall portion 103 surrounds an optical path of the display light 70 from the opening 31 toward the opening 101*a*.

As shown in FIGS. 2 and 3, an image displayed on the image display unit 20 to the driver 200 as a virtual image includes a both-eye region CB that is a region visually recognized by both eyes of the driver 200, a right-eye region CR that is a region not visually recognized by the left eye and only visually recognized by the right eye, and a left-eye region CL that is a region not visually recognized by the right eye and only visually recognized by the left eye. The right-eye region CR and the left-eye region CL are regions on end portion sides in the left-right direction relative to the both-eye region CB. Hereinafter, the right-eye region CR and the left-eye region CL are also collectively referred to as "one-eye region CRL".

Figure 4:
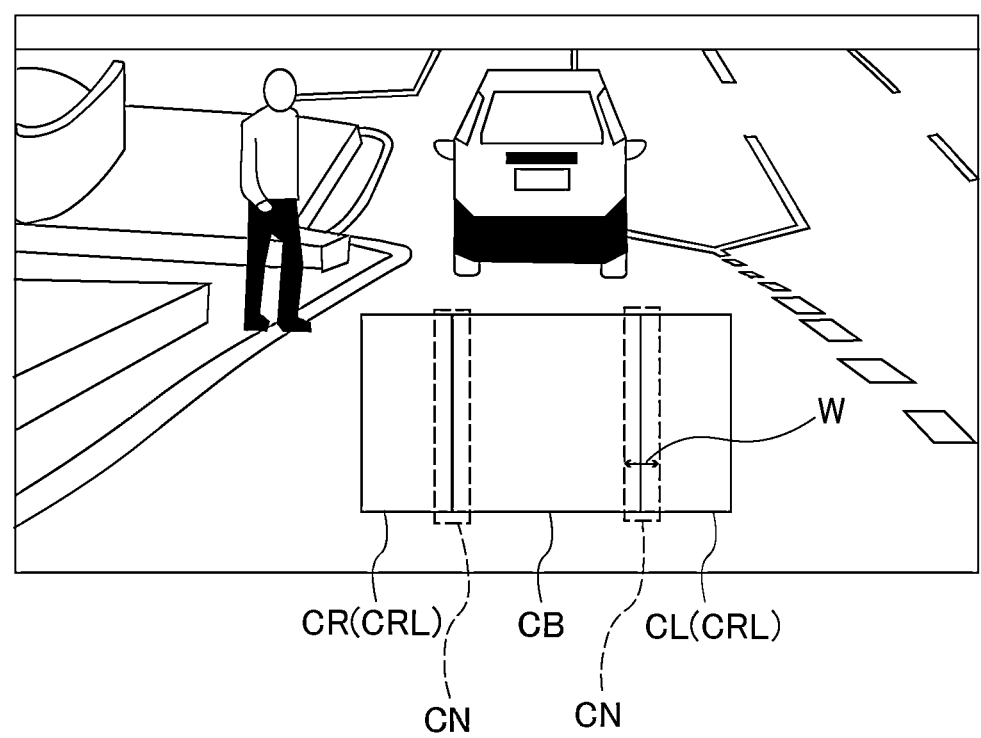
FIG. 4 shows arrangements of regions of a virtual image superimposed on a foreground of the driver.

FIG. 4 shows arrangements of regions of a virtual image superimposed on a foreground of the driver 200. As shown in FIG. 4, a left end region of the virtual image corresponds to the right-eye region CR, a central region of the virtual image corresponds to the both-eye region CB, and a right side region of the virtual image corresponds to the left-eye region CL.

The control unit 23 includes a control circuit that controls the image display unit 20. The control unit 23 is mounted on, for example, a control substrate disposed inside the case 4. The control unit 23 controls the image display unit 20 according to, for example, a program stored in advance to generate an image.

The vehicle 100 includes a driver monitor 104. The driver monitor 104 includes a camera disposed in front of the driver 200. The driver monitor 104 images the driver 200 and generates a driver image. The driver monitor 104 detects a position of a head of the driver 200 and positions of the eyes 201 (viewpoint positions) of the driver 200 based on the driver image. A detection result by the driver monitor 104 is sent to the control unit 23.

The control unit 23 sets the both-eye region CB and the one-eye region CRL (see FIGS. 2 and 3) on a display screen of the image display unit 20, and changes luminance between the both-eye region CB and the one-eye region CRL. The control unit 23 further sets a non-display region CN (see FIGS. 2 and 3) at a boundary portion between the both-eye region CB and the one-eye region CRL on the display screen of the image display unit 20, and performs control such that no static image is displayed in the non-display region CN.

Next, details of the both-eye region CB and the one-eye region CRL will be described with reference to FIG. 2. FIG. 2 shows an optical positional relationship among a virtual image, a second mirror, and the eyes 201 of the driver 200. The positions of the eyes 201 shown in FIG. 2 are central positions of an eye box EB in the left-right direction. The eye box EB is a range assumed in advance as a range in which the positions of the eyes 201 move. The eye box EB has a prescribed width in the left-right direction. The vehicle display device 1 is configured such that an image can be visually recognized from the driver 200 when the eyes 201 are inside the eye box EB.

When light reflected by an entire surface of the second mirror 22 is visually recognized, as shown in FIG. 2, a left end position of the right-eye region CR is on an extension of a light beam "L1" connecting the right eye of the driver 200 and a left end position of the second mirror 22. A right end position of the left-eye region CL is on an extension of a light beam "L2" connecting the left eye of the driver 200 and a right end position of the second mirror 22. The driver 200 cannot visually recognize the left end position of the right-eye region CR with the left eye, and cannot visually recognize the right end position of the left-eye region CL with the right eye.

A left end position of the both-eye region CB is on an extension line of a configuration "L3" connecting the left eye of the driver 200 and a left position of the second mirror 22. A right end position of the both-eye region CB is on an extension line of a configuration "L4" connecting the right eye of the driver 200 and a right position of the second mirror 22.

As is clear from FIG. 2, when the viewpoint positions of the driver 200 are in the central positions of the eye box EB in the left-right direction, the both-eye region CB, the right-eye region CR, and the left-eye region CL can be set based on an interval between both eyes of the driver 200 and an arrangement position of the optical system 25.

FIG. 3 shows a state in which the positions of the eyes 201 are on a right side in the eye box EB. In this case, the both-eye region CB, the right-eye region CR, and the left-eye region CL are shifted to a left side relative to the positions shown in FIG. 2. Conversely, when the positions of the eyes 201 are positions on the left side in the eye box EB, the both-eye region CB, the right-eye region CR, and the left-eye region CL are shifted to the right side relative to the positions shown in FIG. 2. That is, the both-eye region CB, the right-eye region CR, and the left-eye region CL change according to the positions (viewpoint positions) of the eyes 201 of the driver 200.

In the present embodiment, the control unit 23 changes a position of the non-display region CN according to the positions of the eyes 201 detected by the driver monitor 104. In the present embodiment, the control unit 23 obtains an average of amplitude of the head in the left-right direction based on the position of the head detected by the driver monitor 104. Then, the control unit 23 sets a width W (see FIG. 4) of the non-display region CN based on the average.

Next, the operation of the control unit 23 described in the above outline will be described with reference to a flowchart of FIG. 5. The control unit 23 starts processing when an ignition switch is turned on. First, the control unit 23 measures an interval between both eyes of the driver 200 based on a driver image from the driver monitor 104 (S1).

Next, the control unit 23 sets the both-eye region CB, the one-eye region CRL, and the non-display region CN on the display screen of the image display unit 20 when the eyes 201 of the driver 200 are in the central positions of the eye box EB in the left-right direction based on the measured interval between both eyes and a known arrangement position of the optical system 25 (S2).

Thereafter, the control unit 23 functions as a first acquisition unit and acquires the positions of the eyes 201 of the driver 200 detected by the driver monitor 104 (S3). Thereafter, the control unit 23 functions as a first setting unit and changes the positions of the both-eye region CB, the one-eye region CRL, and the non-display region CN based on the positions of the eyes 201 of the driver 200 acquired in S3 (S4).

In S4, when the positions of the eyes 201 of the driver 200 are on the right side in the eye box EB, the control unit 23 shifts the positions of the both-eye region CB, the one-eye region CRL, and the non-display region CN to the left side from the positions set in S2 by an according amount. When the positions of the eyes 201 of the driver 200 are on the left side in the eye box EB, the control unit 23 shifts the positions of the both-eye region CB, the one-eye region CRL, and the non-display region CN to the right side from the positions set in S2 by an according amount.

Thereafter, the control unit 23 functions as a second acquisition unit, and acquires movement of the head of the driver 200 from the position of the head of the driver 200 detected by the driver monitor 104 (S5). Thereafter, the control unit 23 changes the width W of the non-display region CN based on the movement of the head acquired in S5 (S6).

In S5, the control unit 23 mainly acquires the movement of the head of the driver 200 in the left-right direction. In S6, the control unit 23 changes the width W of the non-display region CN based on, for example, the average of the amplitude of the head in the left-right direction. Specifically, the control unit 23 changes the width W of the non-display region CN to a larger value when the average of the amplitude of the head in the left-right direction is large, and changes the width W of the non-display region CN to a smaller value when the average of the amplitude of the head is small.

When S6 ends, the control unit 23 returns to S3 again, and periodically changes the positions of the both-eye region CB, the one-eye region CRL, and the non-display region CN, and the width of the non-display region CN.

Figure 5:
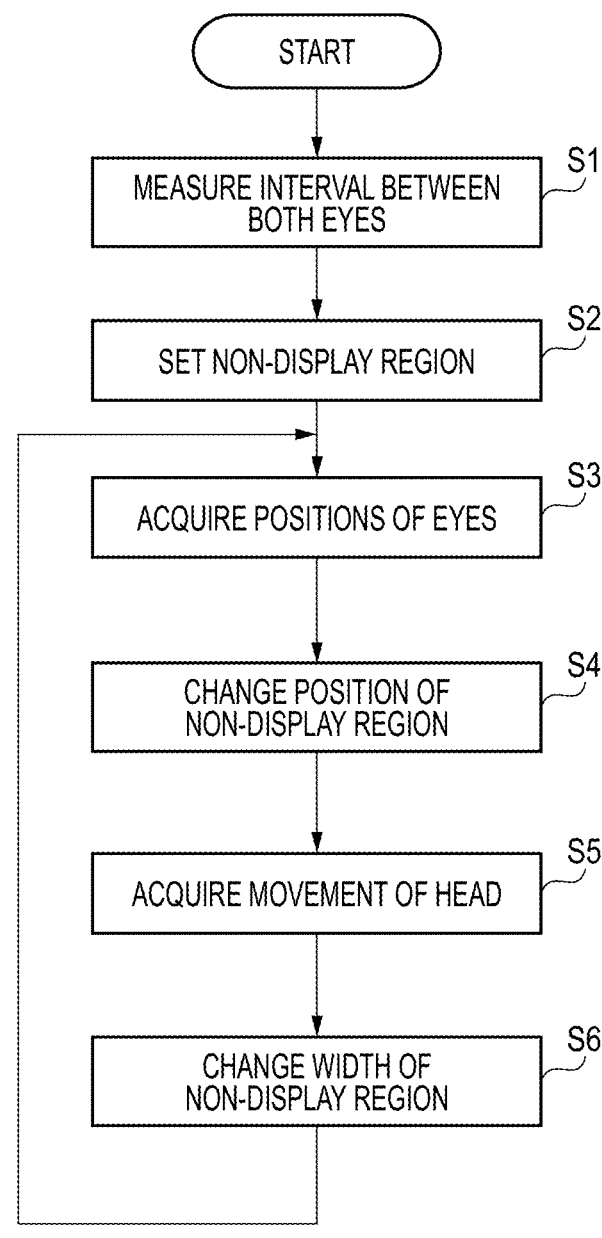
FIG. 5 is a flowchart showing operation of a control unit constituting the vehicle display device shown in FIG. 1.

The control unit 23 controls the image display unit 20 based on the both-eye region CB, the one-eye region CRL, and the non-display region CN set by the operation in the flowchart shown in FIG. 5. The control unit 23 prevents a static image from being displayed in the non-display region CN. For example, when independent designs representing a route guidance, a speed per hour, and time are arranged side by side and displayed in the left-right direction, the control unit 23 prevents the designs from being displayed in the non-display region CN or across the non-display region CN.

According to the above-described embodiment, no static image is displayed in the non-display region CN that is the boundary portion between the both-eye region CB and the one-eye region CRL. Accordingly, no static image is displayed across the boundary portion, and an uncomfortable feeling of the driver 200 can be reduced.

According to the embodiment described above, the control unit 23 sets the width of the non-display region CN based on the movement of the head of the driver 200. Accordingly, even when the head of the driver 200 moves and the positions of the both-eye region CB and the one-eye region CRL vary, it is possible to reduce a probability of a static image being displayed across the boundary portion and to reduce the uncomfortable feeling of the driver 200.

According to the above-described embodiment, the control unit 23 sets the both-eye region CB, the one-eye region CRL, and the non-display region CN based on the positions of the eyes 201 of the driver 200. Accordingly, the non-display region CN can be accurately set at the boundary portion between the both-eye region CB and the one-eye region CRL.

The present disclosure is not limited to the embodiment described above and can be appropriately modified, improved and the like. Materials, shapes, sizes, numbers, arrangement positions, and the like of components in the embodiment described above are freely selected and are not limited as long as the present disclosure can be implemented.

The embodiment described above described a case in which the light reflected by the entire surface of the second mirror 22 is visually recognized by the driver 200. Alternatively, the present disclosure is not limited thereto. For example, an image may be cut off by the lid member 3. In this case, the both-eye region CB and the one-eye region CRL are determined by lines connecting the eyes 201 of the driver 200 and a right end position and a left end position of the opening 31 of the lid member 3.

In the above-described embodiment, the control unit 23 measures the interval between both eyes based on the driver image, and sets the both-eye region CB, the one-eye region CRL, and the non-display region CN based on the measured interval between both eyes. The control unit 23 may set the both-eye region CB, the one-eye region CRL, and the non-display region CN based on a predetermined average interval between both eyes without measuring the interval between both eyes.

In the embodiment described above, the control unit 23 changes (sets) the width W of the non-display region CN based on the average of the amplitude of the head in the left-right direction. Alternatively, the present disclosure is not limited thereto. The control unit 23 may change the width W of the non-display region CN based on a maximum value and a median of the amplitude of the head in the left-right direction.

In the above-described embodiment, the movement of the head is periodically acquired to change the width W of the non-display region CN, and the present disclosure is not limited thereto. For example, the movement of the head in first prescribed time from the ignition ON may be acquired, the width W of the non-display region CN may be set based on the acquired movement of the head, and the width W may not be changed thereafter.

Here, features of the embodiment of the vehicle display device according to the present disclosure described above are briefly summarized and listed in following [1] to [3].

[1] A vehicle display device (1) includes:

an image display unit (20) configured to emit display light (70) for an image;

an optical system (25) configured to project the display light (70) emitted from the image display unit (20) toward a reflecting surface in front of a driver (200); and a control unit (23) configured to control the image display unit (20), wherein the image includes a both-eye region (CB) that is a region visually recognized by both eyes of the driver (200) and a one-eye region (CRL) that is a region visually recognized by only one eye of the driver (200), and the control unit (23) sets a non-display region (CN) at a boundary portion between the both-eye region (CB) and the one-eye region (CRL) and performs control such that at least no static image is displayed in the non-display region (CN).

According to the vehicle display device (1) having the configuration of [1], no static image is displayed in the non-display region (CN) that is the boundary portion between the both-eye region (CB) and the one-eye region (CRL). Accordingly, it is possible to reduce a probability of the static image being displayed across the boundary portion and to reduce an uncomfortable feeling of the driver (200).

[2] The vehicle display device (1) according to [1] further includes:

a first acquisition unit (23) configured to acquire movement of a head of the driver (200); and a first setting unit (23) configured to set a width of the non-display region (CN) in a horizontal direction based on the movement of the head of the driver (200) acquired by the first acquisition unit (23).

According to the vehicle display device (1) having the configuration of [2], even when the head of the driver (200) moves and the positions of the both-eye region (CB) and the one-eye region (CRL) vary, it is possible to reduce a probability of a static image being displayed across the boundary portion and to reduce the uncomfortable feeling of the driver (200).

[3] The vehicle display device (1) according to [1] further includes:

a second acquisition unit (23) configured to acquire a viewpoint position of the driver (200); and a second setting unit (23) configured to set a position of the non-display region (CN) based on the viewpoint position of the driver (200) acquired by the second acquisition unit.

According to the vehicle display device (1) having the configuration of (3), the non-display region (CN) can be accurately set at the boundary portion between the both-eye region (CB) and the one-eye region (CRL).

What is claimed is:

1. A vehicle display device comprising:

an image display unit that emits display light for an image;

an optical system that projects the display light emitted from the image display unit toward a reflecting surface in front of a driver; and a control unit that controls the image display unit, wherein the image includes a both-eye region that is a region visually recognized by both eyes of the driver and a one-eye region that is a region visually recognized by only one eye of the driver,

the control unit sets a non-display region at a boundary portion between the both-eye region and the one-eye region and controls such that at least no static image is displayed in the non-display region, the control unit sets a width of the non-display area based on an average amplitude of movement of a head of the driver in a left-right direction, and the control unit changes the width of the non-display area in proportion to a change in the average amplitude.

2. The vehicle display device according to claim 1, wherein the control unit includes a first acquisition unit that acquires movement of the head of the driver in the left-right direction;

the control unit determines the average amplitude of movement of the head of the driver based on the movement of the head of the driver acquired by the first acquisition unit, and the control unit includes a first setting unit that sets the width of the non-display region in a horizontal direction based on the average amplitude of movement of the head of the driver.

3. The vehicle display device according to claim 1, wherein the control unit includes:

a second acquisition unit that acquires a viewpoint position of the driver; and a second setting unit that sets a position of the non-display region based on the viewpoint position of the driver acquired by the second acquisition unit.

* * * * *